US005737540A

United States Patent [19]

Ogawa

[11] Patent Number: 5,737,540
[45] Date of Patent: Apr. 7, 1998

[54] DATA COMMUNICATION SYSTEM THROUGH PERSONAL COMPUTERS AND TERMINAL ADAPTER THEREFOR

[75] Inventor: Hironobu Ogawa, Nagoya, Japan

[73] Assignee: Hisago Communications Kabushiki Kaisha, Nagoya, Japan

[21] Appl. No.: 378,365

[22] Filed: Jan. 25, 1995

[30] Foreign Application Priority Data

Jun. 7, 1994 [JP] Japan .................. 6-150509

[51] Int. Cl.⁶ ........................................ G06F 13/00
[52] U.S. Cl. ............................. 395/281; 395/750
[58] Field of Search ........................ 395/281, 280, 395/309, 823, 200.04, 200.01

[56] References Cited

U.S. PATENT DOCUMENTS

| | | | |
|---|---|---|---|
| 4,384,307 | 5/1983 | Kuzmik et al. | 358/257 |
| 4,524,242 | 6/1985 | Fish, III et al. | 178/4 |
| 4,574,284 | 3/1986 | Feldman et al. | 340/825.52 |
| 4,582,959 | 4/1986 | Myslinski et al. | 179/27 FH |
| 4,716,543 | 12/1987 | Ogawa et al. | 395/145 |
| 4,754,428 | 6/1988 | Schultz et al. | 395/200.18 |
| 4,941,170 | 7/1990 | Herbst | 379/100 |
| 4,964,154 | 10/1990 | Shimotono | 379/100 |
| 5,012,233 | 4/1991 | Poulsen, Jr. | 340/825.18 |
| 5,247,615 | 9/1993 | Mori et al. | 395/200.04 |
| 5,299,255 | 3/1994 | Iwaki et al. | 379/96 |
| 5,333,266 | 7/1994 | Bouz et al. | 395/200.01 |
| 5,530,894 | 6/1996 | Farrell et al. | 395/800 |

OTHER PUBLICATIONS

Abstract, "Electronic Mail Distribution System", (JP 63-114337) May 19, 1988.
Abstract, "Electronic Mail Controller", (JP 5-183576) Jul. 23, 1993.
Abstract, "Destination Designating Method", (JP 6-4429) Jan. 14, 1994.
Abstract, "Electronic Mail System", (JP 5-252199) Sep. 28, 1993.
Abstract, "Personal Computer Communication Control Equipment", (JP 6-244900) Sep. 2, 1994.
Abstract, "System for Confirming Arrival of Simple Electronic Mail", (JP 3-3450) Jan. 9, 1991.
Abstract, "Electronic Mail System", (JP 6-6384) Jan. 14, 1994.

*Primary Examiner*—Ayaz R. Sheikh
*Attorney, Agent, or Firm*—Wenderoth, Lind & Ponack

[57] ABSTRACT

In a data communication system, a plurality of personal computers are connected through respective terminal adapters to a telephone line. Each terminal adapter includes a communication control section, a storage section and a network control unit (NCU). The communication control section includes a central processing unit (CPU), a read only memory (ROM) and a modulator-demodulator or modem. The terminal adapter has a power supply independent of a power supply of the personal computer so that power can be applied to the terminal adapter even when the personal computer is not connected to the power supply. The terminal adapter can automatically receive a mail regardless of the status of the personal computer. The received mail is stored in the storage section of the terminal adapter. When a recipient reads the received mail, the personal computer is started up and a key board connected to the personal computer is operated in accordance with a menu. In transmission of a mail, the key board is operated in accordance with a menu so that a desired addressee is automatically called and the mail is automatically transmitted to the addressee.

4 Claims, 9 Drawing Sheets

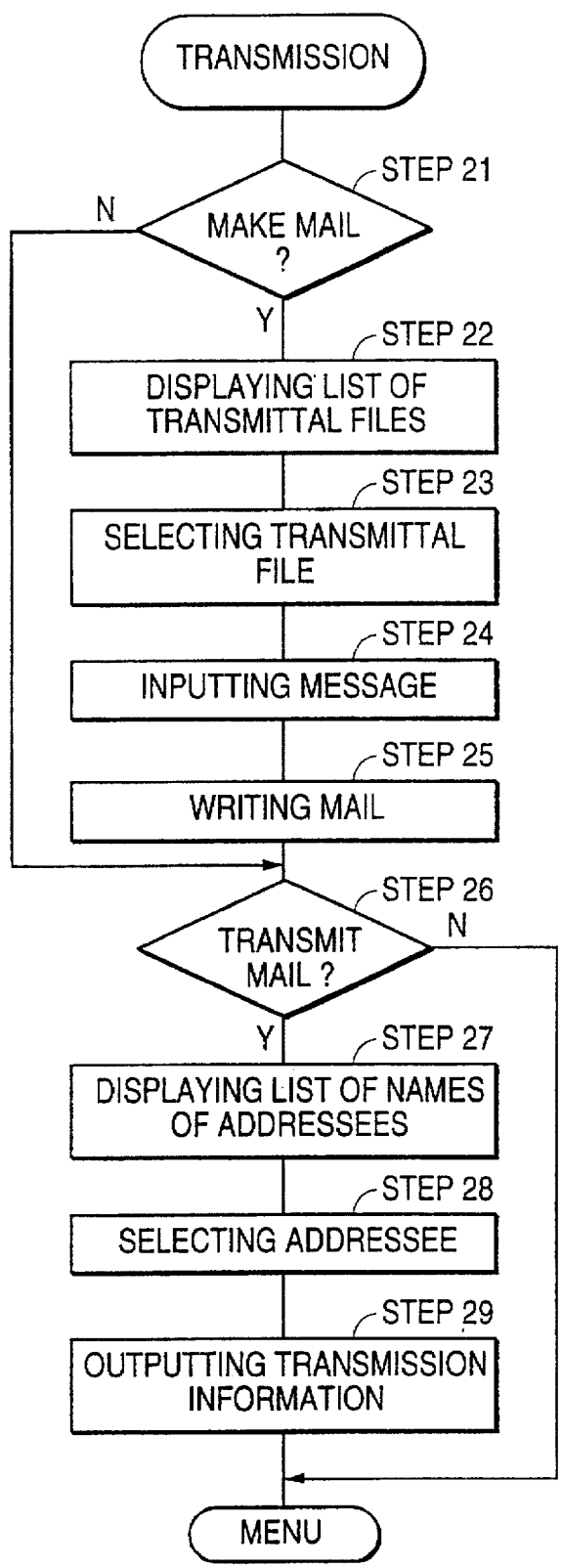

DATA COMMUNICATION SYSTEM THROUGH PERSONAL COMPUTERS AND TERMINAL ADAPTER THEREFOR

BACKGROUND OF THE INVENTION

1. Field of the Invention

This invention relates to a data communication system and a terminal adapter therefor for a so-called electronic mail system.

2. Description of the Prior Art

In an electronic mail system, information is exchanged between users with personal computers. Each personal computer serving as a terminal unit is connected to a host computer through a modulator-demodulator or modem and a telephone line. A large-scale computer with high throughput is usually employed as the host computer so that a large quantity of data transmitted thereto from the personal computers is processed.

In making use of the electronic mail system, a sender previously makes a transmission file for the electronic mail using a word processor software installed in his or her personal computer. The sender then runs an installed communication software to designate a particular addressee and a file to be transmitted. The electronic mail is transmitted from the personal computer to the host computer through the telephone line and stored in a storage section of the host computer. On the other hand, a recipient reads data stored in the storage section of the host computer through his or her personal computer. When finding the electronic mail addressed to him or her, the recipient inputs the mail to his or her personal computer.

In the above-described electronic mail system, a large number of personal computers are connected to the single host computer in a so-called radial manner. Accordingly, a large-scale computer is employed as the host computer. However, the employment of the large-scale computer as the host computer makes it difficult to easily establish the electronic mail system.

It has been proposed that the personal computers should directly be connected with one another through the modems and the telephone line. In this case, however, the sender cannot transmit the electronic mail unless the personal computer of the recipient is in an accessible state or unless a power-supply switch of the recipient's personal computer is turned on. Accordingly, every time when transmitting the electronic mail, the sender needs to confirm by telephone or the like that the recipient's personal computer is ready for receiving the electronic mail. This poses a problem in practical use of the electronic mail system.

SUMMARY OF THE INVENTION

Therefore, an object of the present invention is to provide a data communication system and terminal equipment therefor wherein the electronic mail system can easily be established and data such as the electronic mail can be transmitted even when the power-supply switch of the recipient's personal computer is not turned on.

To achieve the above-described and other objects, the present invention provides a data communication system for exchanging data through a communication line between computers. The system comprises a terminal adapter provided in each computer for transmitting and receiving the data to and from the other computer. The terminal adapter comprises an input-output section connected to the communication line for inputting and outputting the data from and to the communication line, a storage section from which the data is readable at the computer side and into which the data is writable at the computer side, a communication control section inputting the data from the storage section and outputting the input data to the input-output section according to an instruction from the computer, the communication control section writing the data input to the input-output section into the storage section independently of the operation of the computer, and a power supply provided independently of the computer.

According to the above-described system, each computer is connected to the communication line through the terminal adapter, whereupon a communication system is established wherein the computers are directly connected to each other through the communication line. The data delivered from the computer is written into the storage section of the terminal adapter. According to an instruction from the computer, the communication control section transfers the data to the input-output section, which then delivers the data to the communication line. On the other hand, the data transmitted from the other computer through the communication line is received by the input-output section. The communication control section writes the received data into the storage section of the terminal adapter. The power supply of the terminal adapter is provided independently of that of the computer. Accordingly, even when the computer is disconnected from the power supply, the terminal adapter can be operated such that the data is written into the storage section. Then, the microcomputer inputs the written data from the storage section of the terminal adapter.

The present invention also provides a terminal unit provided in a data communication system for exchanging data through a communication line between computers, the terminal unit comprising a terminal adapter and the computer. The terminal adapter comprises an input-output section connected to the communication line for inputting and outputting the data from and to the communication line, a storage section from which the data is readable at the computer side and into which the data is writable at the computer side, a communication control section inputting the data from the storage section and outputting the input data to the input-output section according to an instruction from the computer, the communication control section writing the data input to the input-output section into the storage section independently of the operation of the computer, and a power supply provided independently of the computer. Each computer comprises an addressee information storage section storing information about one or more addressees, the informing including the names of the addressees, a transmittal file storage section for storing one or more files to be transmitted, a received file storage section for storing a file received through the communication line, transmittal information displaying means for displaying, on a display unit provided at said each one computer, a list of the names of the addressees stored in the addressee information storage section and the names of the files stored in the transmittal file storage section, transmittal information selecting means for selecting one of the names of the addressees and one of the names of the files displayed on the display unit by the transmittal information displaying means, by way of an input device provided in the computer, transmission control means outputting the addressee information selected by the transmittal information selecting means to a communication control section of the terminal adapter, transmitted file writing means for writing, into a storage section of the terminal adapter, the transmitted file on the basis of the file name selected by the transmittal information selecting means, received file displaying means for displaying, on the display unit, a list of the names of the received files written into the storage section of the terminal adapter, received file selecting means for selecting desired one of the file names displayed in the form of the list on the display unit by the received file displaying means, and received file writing means for writing, into a received file storage section, the received file on the basis of the file name selected by the received file selecting means.

According to the above-described terminal unit, an electronic mail is previously prepared and then stored in the transmittal file storage section with a name of the electronic mail when the electronic mail is to be sent from one terminal unit to the other. Furthermore, the information about the addressees, such as their names and telephone numbers, is previously stored in the addressee information storage section. The name of the electronic mail is displayed on the display unit connected to the computer. When much mail is stored at one time, the list of the contents of the mail is displayed on the display unit. A desired mail is selected by an input device connected to the computer. The selected mail is then written into the storage section of the terminal adapter.

The names of the addressees, their telephone numbers and the like are also displayed on the display unit. When one of the addressees is selected by the input device, the data of the selected addressee's name, telephone number and the like is transferred to the terminal adapter. The communication control section calls the terminal adapter of the selected addressee on the basis of the telephone number of the selected addressee-and the like. The communication control section further transfers the electronic mail written into the storage section to the input-output section, which then delivers the mail to the communication line.

When the electronic mail from the other terminal unit is received by the input-output section of the terminal adapter, the communication control section writes the received mail into the storage section of the terminal adapter. The power supply of the terminal adapter is provided independently of that of the computer. Accordingly, even when the computer is disconnected from the power supply, the terminal adapter can be operated such that the mail received by the input-output section is written into the storage section. The name assigned the mail written into the storage section is displayed on the display unit. When a plurality of such received mails are stored in the storage section, a list of all the names are displayed on the display unit. When a desired mail is selected by the input device, the selected mail is transferred from the storage section of the terminal adapter to the received electronic mail storage section of the computer. A word processor software installed in the computer is run for the recipient to read the mail.

BRIEF DESCRIPTION OF THE DRAWINGS

Other objects, features and advantages of the present invention will become clear upon reviewing the following description of the preferred embodiment thereof, made with reference to the accompanying drawings, in which:

FIG. 9 is a flowchart showing the procedure for transmitting the electronic mail.

DESCRIPTION OF THE PREFERRED EMBODIMENT

One embodiment of the present invention will be described with reference to the accompanying drawings. A data communication system of the embodiment is provided for exchanging information between personal computers through a telephone line. Each terminal unit comprises the personal computer and a terminal adapter.

Figure 1:
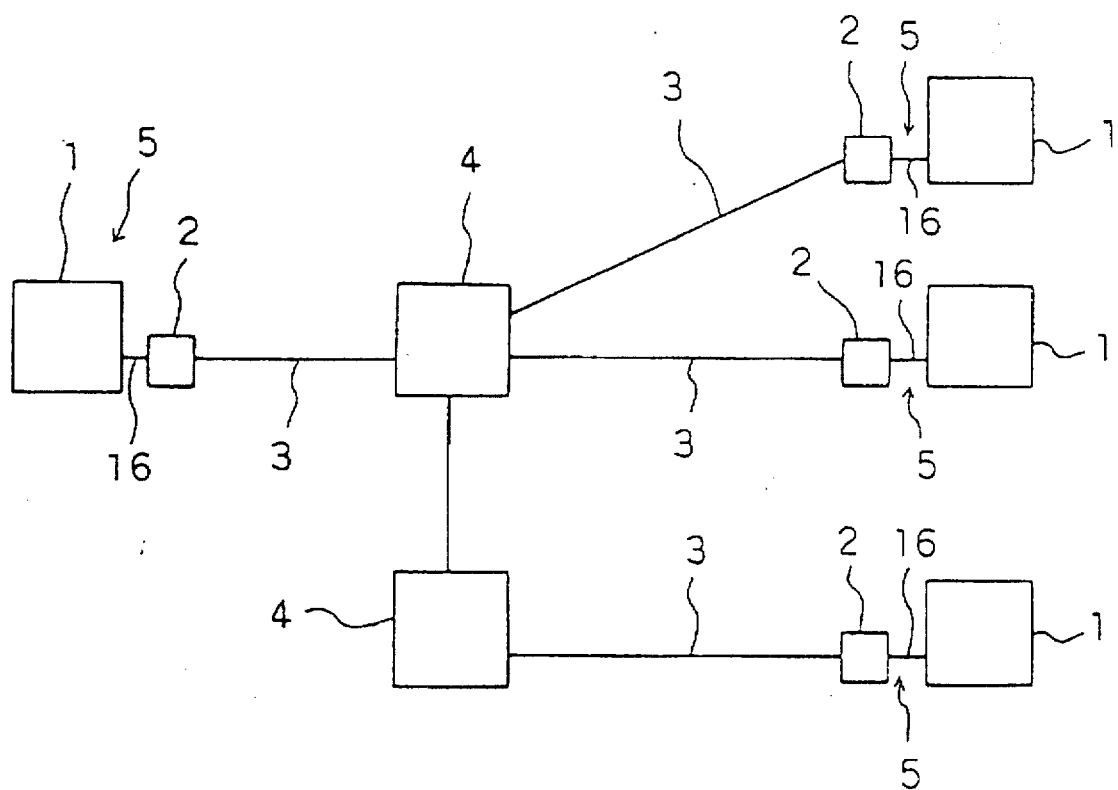
FIG. 1 is a block diagram showing the connection of parts in one embodiment of a data communication system in accordance with the present invention.

The connection between the terminal units will first be described. Referring to FIG. 1, each personal computer 1 is connected through a terminal adapter 2 to a public telephone line 3. Each personal computer 1 is connected through switchboards of the telephone station 4 to terminal units 5.

Figure 2:
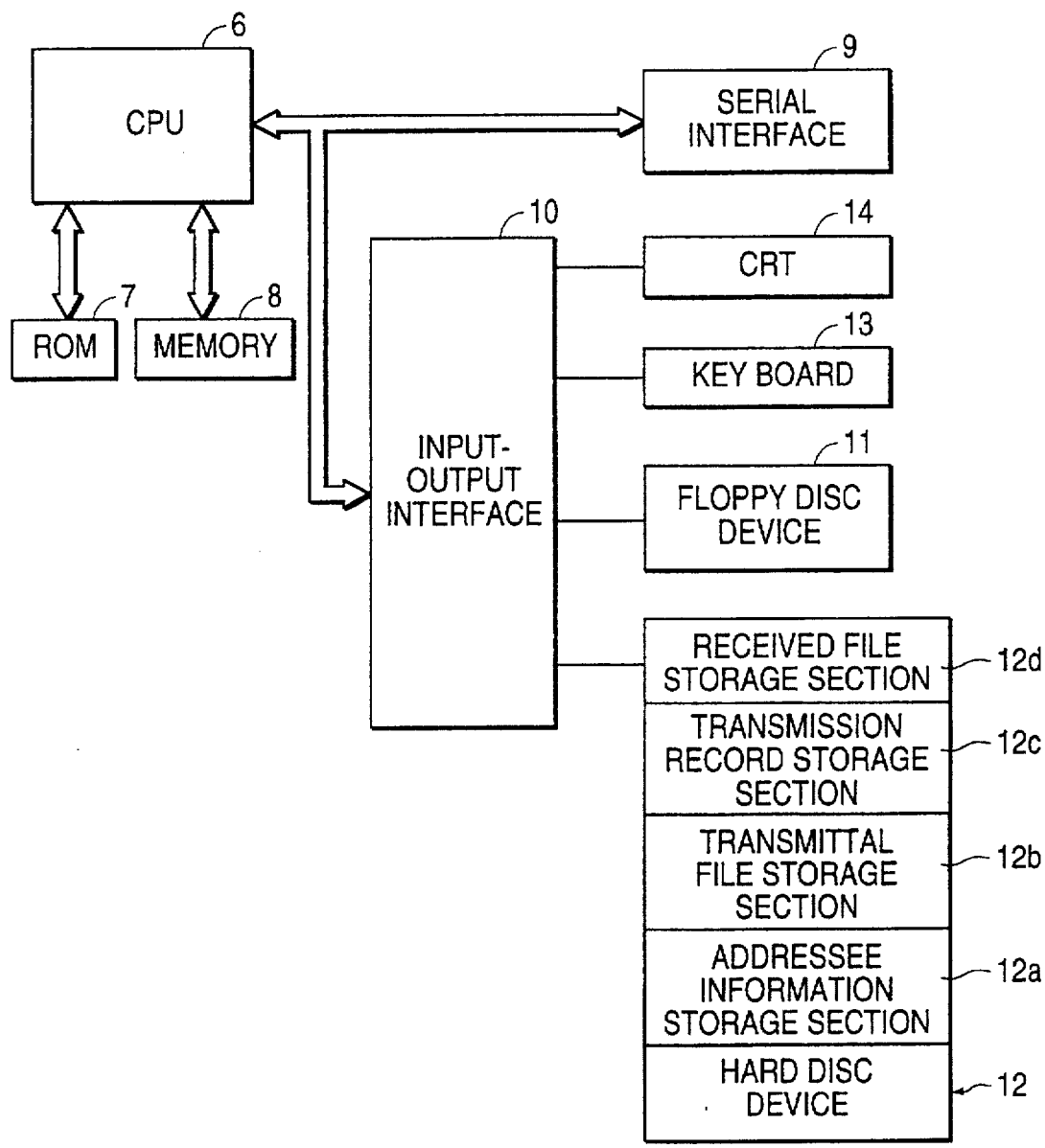
FIG. 2 is a block diagram showing schematic arrangement of a personal computer employed in the data communication system.

Referring now to FIG. 2, each personal computer 1 comprises a central processing unit (CPU) 6 controlled by a basic input-output system (BIOS) whose data is stored in a read only memory (ROM) 7. Each personal computer 1 further comprises a memory 8, a serial interface 9 and an input-output interface 10. A floppy disc unit 11, a hard disc unit 12, a key board 13 and a cathode ray tube (CRT) 14 composing a display unit are connected through the input-output interface 10 to CPU 6.

Figure 3:
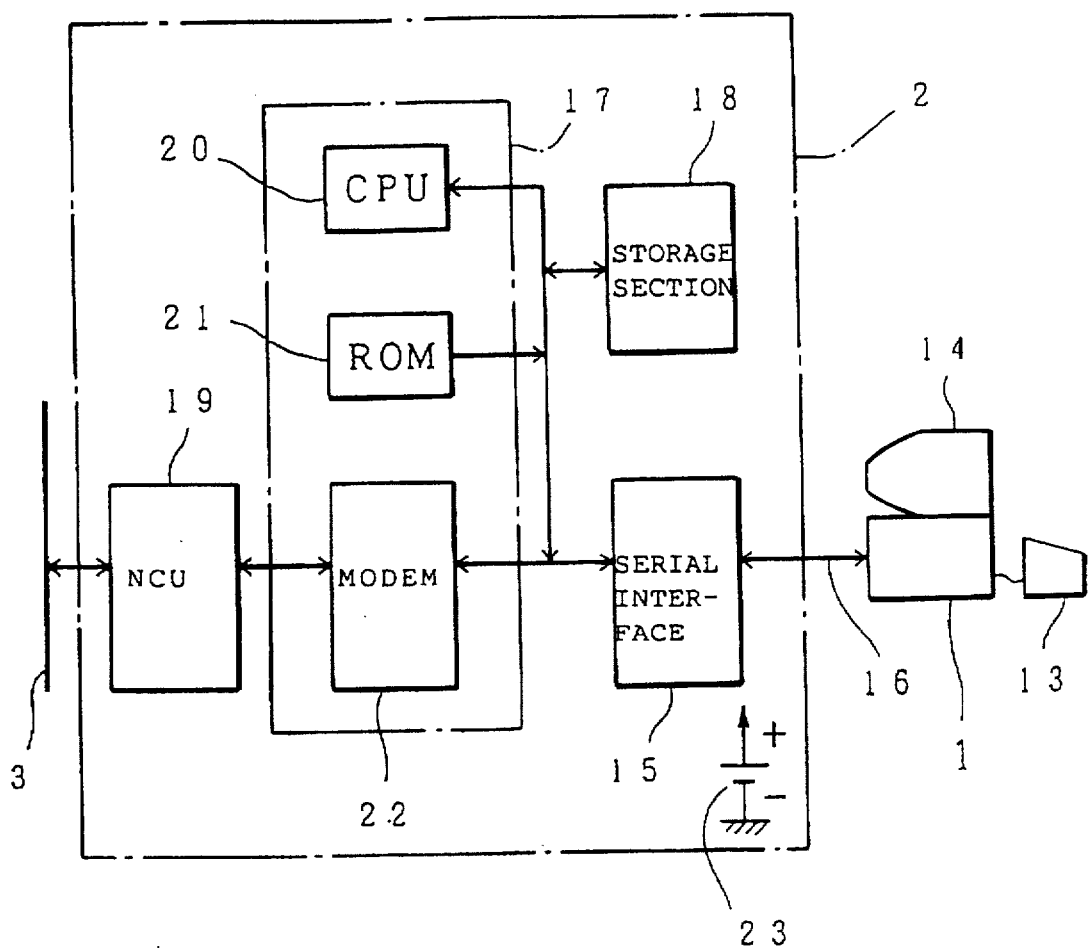
FIG. 3 is a block diagram showing the arrangement of a terminal adapter for the data communication system.

The terminal adapter 2 is discrete from the personal computer 1. The terminal adapter 2 is provided with a serial interface 15 connected to the serial interface 9 of the personal computer 1 through a serial transmission path 16 which is in conformity to RS-232C of the Electronic industrial Association (EIA) in U.S.A., as shown in FIG. 3.

The terminal adapter 2 further comprises a communication control section 17, a storage section 18 comprising a static random access memory (SRAM) and a line control unit or network control unit (NCU) 19. The communication control section 17 comprises a central processing unit (CPU) 20 and a read only memory (ROM) 21 in which a control program for the control of communication is written. The communication control section 17 further comprises a modulator-demodulator or modem 22 modulating data to be transmitted and demodulating received data. The storage section 18 is provided for storing the data to be transmitted and the received data. NCU 19 is connected to the telephone line 3 to deliver to the telephone line 3 the data modulated by the modem 22 of the communication control section 17. NCU 19 further delivers to the modem 22 the data received from the telephone line 3.

The terminal adapter 2 has a power supply composed independently of a power supply of the personal computer 1. Accordingly, power can be applied to the terminal adapter 2 even when the personal computer 1 is not connected to the power supply. The terminal adapter 2 further includes a reception indicator indicating that data is being received, a transmission indicator indicating that data is being transmitted, and a reset switch for resetting the terminal adapter 2, none of which are shown.

Figure 4:
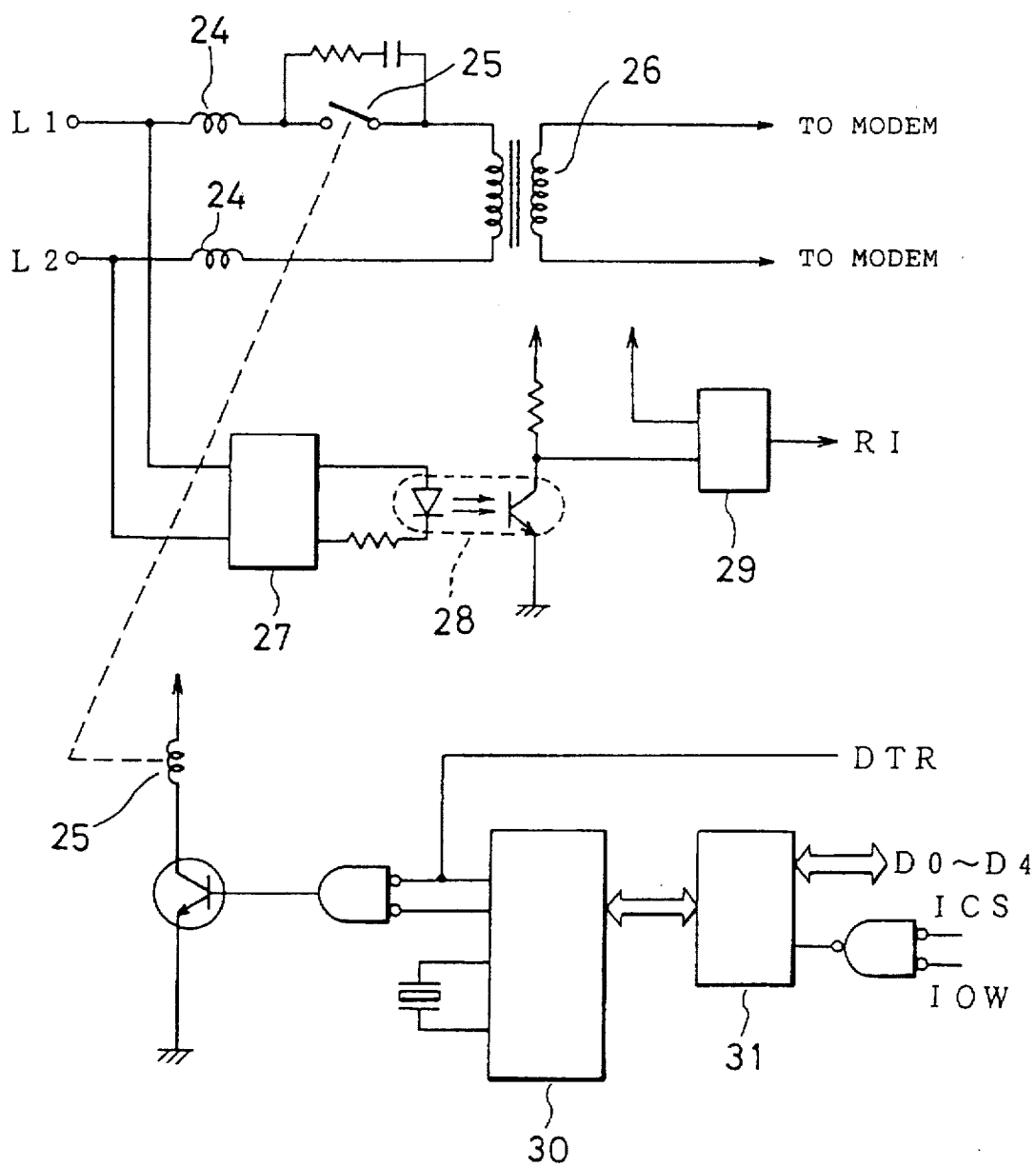
FIG. 4 is a circuit diagram of a network control unit (NCU) employed in the data communication system.
Figure 5:
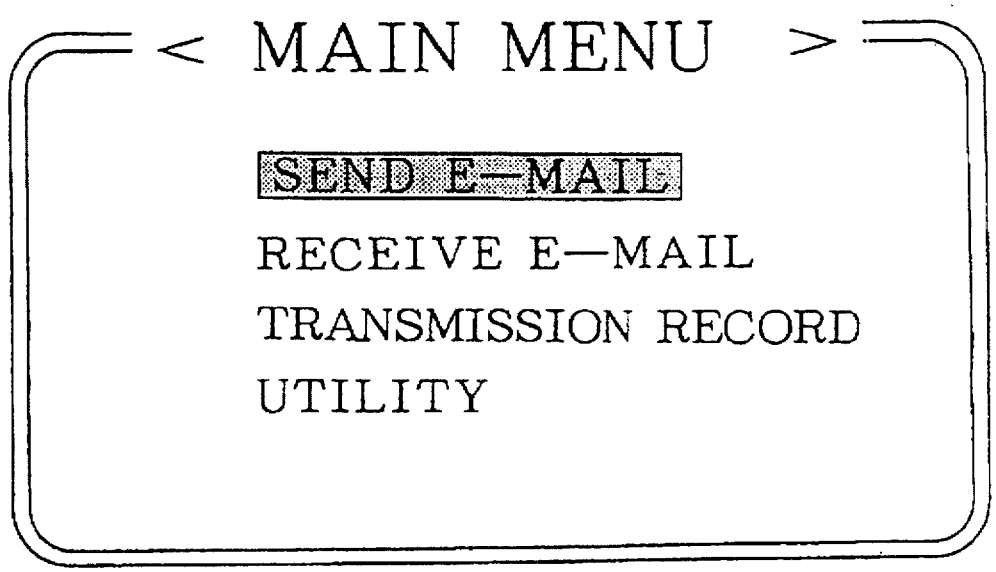
FIG. 5 illustrates a main menu displayed on a display unit connected to a personal computer composing the data communication system.

Referring now to FIG. 4 showing the arrangement of NCU 19, a two-wire telephone line is connected to input terminals L1 and L2. A noise filter 24 and an off-hook relay 25 are connected between the input terminals L1 and L2 so that a direct current loop is formed between them. A line transformer 26 is also connected between the input terminals L1 and L2. The secondary side of the line transformer 26 is connected to the modem 22. Data is transmitted and received through the line transformer 26 between the modem 22 and a modem at the other end of the telephone line.

The input terminals L1 and L2 are further connected to a ring detector IC 27 detecting a call signal delivered from the telephone office 4. Output of the ring detector IC 27 is insulated by a photo coupler 28 and delivered through a latch circuit 29 to the communication control section 17. This output signal of the ring detector IC 27 is referred to as ringing indication (RI) signal. When confirming the RI signal, the communication control section 17 delivers a data terminal ready (DTR) signal so that the off-hook relay 25 is closed, whereby the data can be received. The data transmitted from a fellow station at the other end of the telephone line is automatically received and stored in the storage section 18.

NCU 19 further comprises a dial IC 30 to which a register 31 is connected. CPU 20 writes data into the register 31. In this case, each of input-output chip select (ICS) and input-output write (IOW) is turned to the low level. Based on the written data, the register 31 opens and closes the off-hook relay 25 so that dial pulses are delivered to the telephone line to call a person at the other end of the telephone line. When response is made to the dial pulses, the data is delivered from the modem 22 to the telephone line through the line transformer 26. Thus, the data stored in the storage section 18 is automatically transmitted to the fellow station at the other end of the telephone line.

A communication software is installed in the personal computer 1 so that the following operations are executed. Upon application of power to the personal computer 1, a menu is displayed on CRT 14 as shown in FIG. 4. In the menu, an item, "SEND E-MAIL" refers to an operation for sending an electronic mail, an item, "RECEIVE E-MAIL" to an operation for reading the received mail, an item, "TRANSMISSION RECORD" to an operation for confirming as to whether the mail has been normally transmitted or not, and an item, "UTILITY" to an operation for executing various settings necessary for the communication, such as the setting of the time. Each item can be selected on the key board 13. That is, the cursor is moved to a desired item on the display with cursor keys and the return key is depressed.

Upon selection of "SEND E-MAIL," another menu containing items of "ADDRESSEE REGISTRATION" and "TRANSMISSION" is further displayed. When "ADDRESSEE REGISTRATION" is selected, information about the addressee, such as the name, telephone number of the addressee and the like, is stored in an addressee information storage section 12a of the hard disc unit 12. When "TRANSMISSION" is selected, a desired one of the addressees, the data of which is stored in the addressee information storage section 12a, is selected and the electronic mail is transmitted to the selected addressee.

Figure 6:
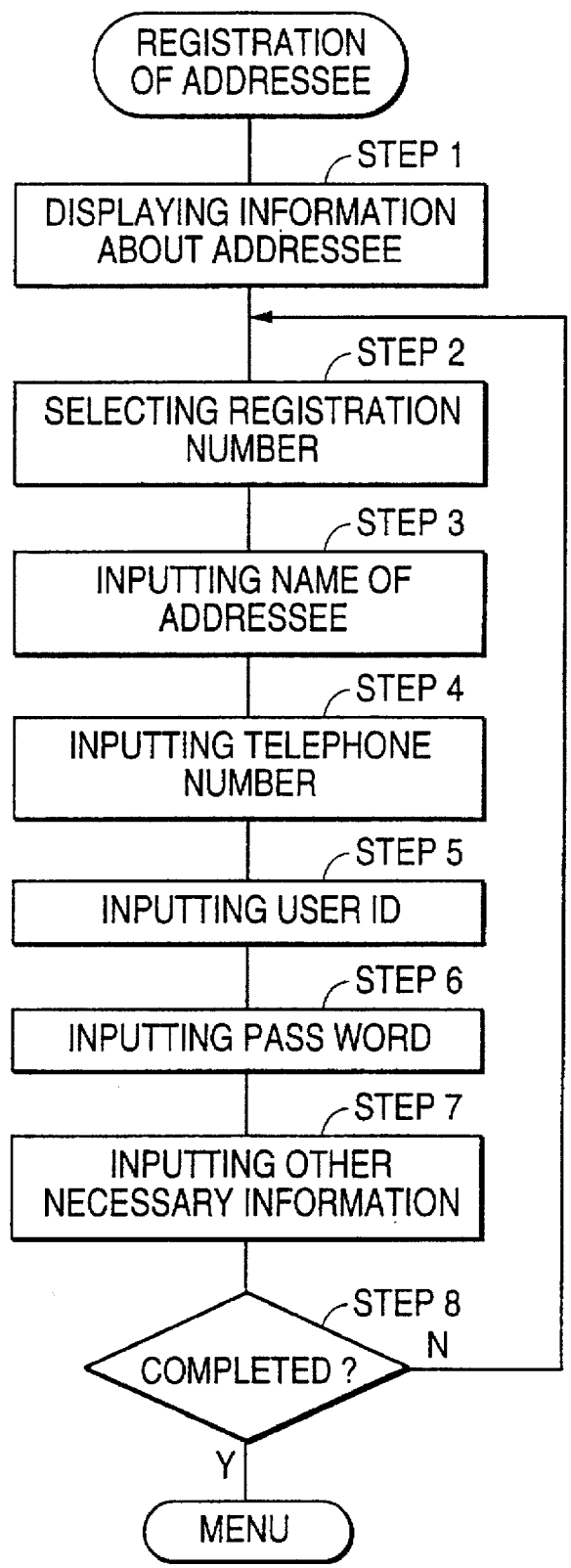
FIG. 6 is a flowchart showing the procedure for registering an addressee.

The registration of addressees will be described with reference to FIG. 6. Upon selection of the menu item of "ADDRESSEE REGISTRATION," listed addressee information stored in the addressee information storage section 12a is displayed on CRT 14 in the order of registration numbers (step 1). One of the registration numbers for which the addressee information has not been registered is selected with the key board 13 (step 2) and the name of the addressee is then input (step 3). Furthermore, the telephone number of the addressee, the user identification, the pass word and other necessary information are sequentially input (steps 4 to 7). Thereafter, the instruction, "Completed? Y/N" is displayed (step 8). The menu is redisplayed upon depression of the "Y" key while the control sequence returns to step 2 for further registration of the addressee information when the "N" key is depressed at step 8.

FIG. 9 shows the control sequence when the menu item of "TRANSMISSION" is selected. Upon selection of "TRANSMISSION," the instruction, "Make an electronic mail? Y/N" is displayed (step 21). When the "Y" key is depressed, the listed names of the transmittal files stored in a transmittal file storage section 12b of the hard disc unit 12 are displayed on CRT 14 (step 22). Each file is previously made with a commercially available word processor software and constitutes the electronic mail. When the cursor is moved to desired one of the displayed transmittal files with the cursor keys and the return key is then depressed, the desired transmittal file is selected (step 23). Then, when the control is ready for input of the message, the message is input (step 24). The input message is transmitted with the transmittal file and constitutes the electronic mail. Upon completion of input of the message, the electronic mail is delivered from the serial interface 9 to be transmitted to the terminal adapter 2. The electronic mail is read by CPU 20 through the serial interface 15 of the terminal adapter 2 and written into the storage section 18 (step 25).

When the "N" key is depressed at step 21 and when the electronic mail has been written into the storage section 18 of the terminal adapter 2 at step 25, the instruction, "Transmit electronic mail? Y/N" is displayed on CRT 14 (step 26). When "Y" key of the key board 13 is depressed, the list of the names of the addressees is displayed on CRT 14 (step 27). The cursor is moved to a desired addressee in the list with the cursor keys of the key board 13 and the return key is depressed so that the desired addressee is selected (step 28). Then, out of the addressee information stored in the addressee information storage section 12a, the selected addressee information is delivered from the serial interface 9 to be transmitted to the terminal adapter 2 (step 29). Various instructions are transmitted to the terminal adapter 2 together with the addressee information. CPU 20 of the terminal adapter 2 reads the transmitted instructions and addressee information through the serial interface 15. Based on the read data, CPU 20 calls the terminal adapter 5 of the addressee.

In calling the terminal adapter 5 of the addressee, CPU 20 writes the dial data into the register 31 on the basis of the transmitted instructions and addressee information. The dial IC 30 then opens and closes the off-hook relay 25 on the basis of the written dial data, so that the off-hook relay 25 delivers dial pulses to the telephone line 3. Based on the delivered dial pulses, the telephone office 4 calls the addressee.

The electronic mail stored in the storage section 18 is read out when the addressee has been connected to the telephone line 3. The electronic mail is modulated by the modem 22 and then delivered from NCU 19 to the telephone line 3. On the other hand, when the "N" key is depressed at step 26, the electronic mail is not transmitted and the control sequence returns to the initial display of the menu. The electronic mail is still stored in the storage section 18. Accordingly, the electronic mail can be transmitted in accordance with the above-described procedure when the menu item, "TRANSMISSION" is reselected and the "N" key is depressed at step 21.

Figure 8:
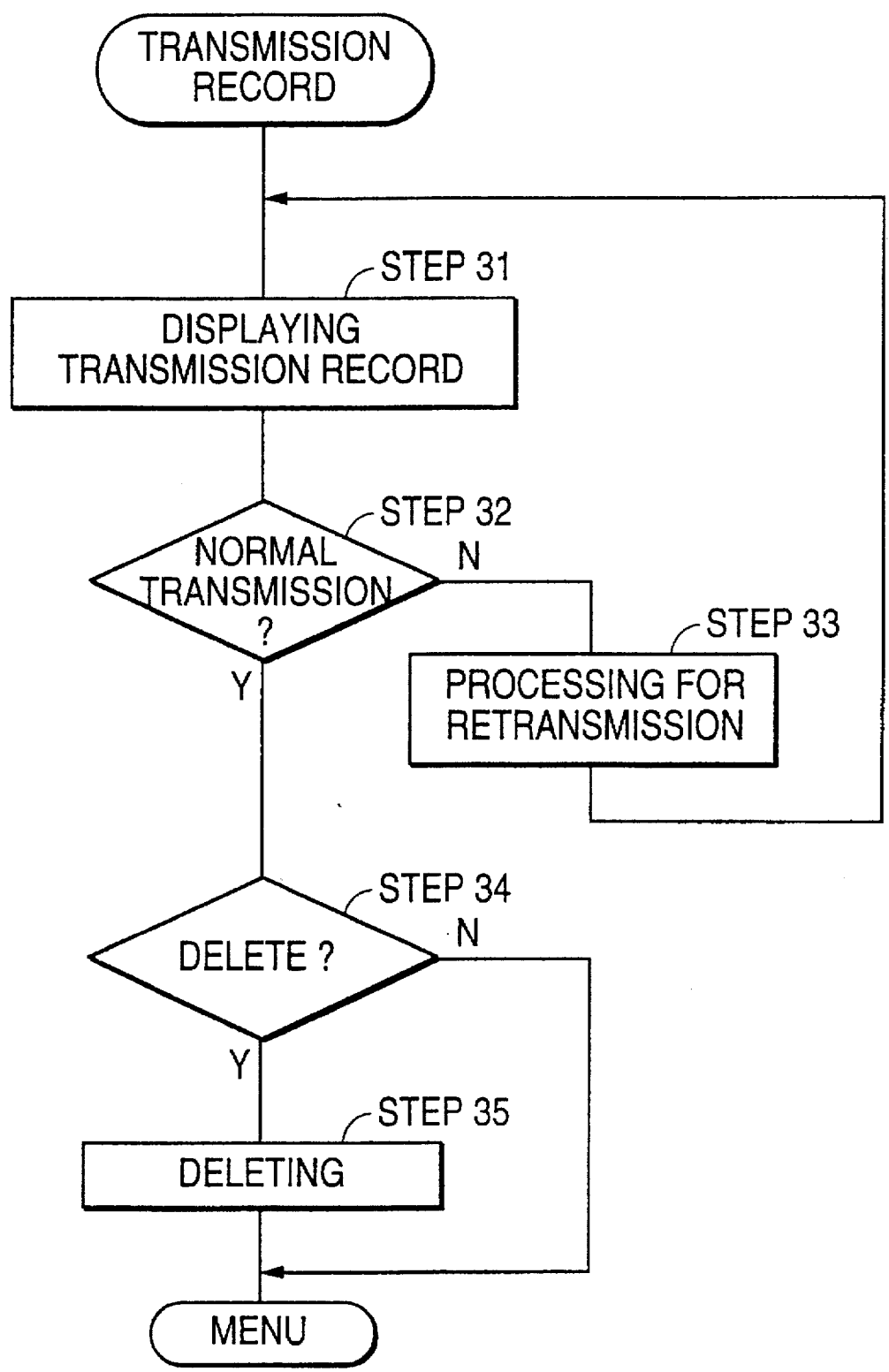
FIG. 8 is a flowchart showing the procedure for confirming normal transmission of the electronic mail.

The menu item, "TRANSMISSION RECORD" is selected in the menu when the sender confirms as to whether or not the electronic mail has normally been transmitted, after transmission of the mail. Referring to FIG. 8, the transmission record stored in a transmission record storage section 12c of the hard disc unit 12 is displayed on CRT 14 (step 31). The transmission record storage section 12c stores data of the status of transmission when the terminal adapter 2 has completed the transmission. For example, "NORMALLY COMPLETED" is stored when the transmission of the electronic mail has normally been completed while "NO RESPONSE" is stored when the transmission has abnormally been completed without response of the terminal adapter 5 of the addressee. The transmission record displayed on CRT 14 is confirmed (step 32), and retransmitting processing is performed (step 33) when the transmission has not been normally completed. In the retransmission processing, the reset switch of the terminal adapter 2 is depressed so that the terminal adapter 2 is reset. Thereafter, when a predetermined key for retransmission is depressed, the addressee information and the necessary instructions are retransferred to the terminal adapter 2, which then transmits the electronic mail. Since the transmission record is thereafter displayed (step 31), the sender confirms as to whether the transmission has normally been performed. When the transmission record denotes that the transmission has normally been performed, the determination is made as to whether the transmission record is deleted or not (step 34). A predetermined key of the key board 13 is depressed when the transmission record is deleted (step 35). When the transmission record is to be stored, the "N" key is depressed at step 34.

Figure 7:
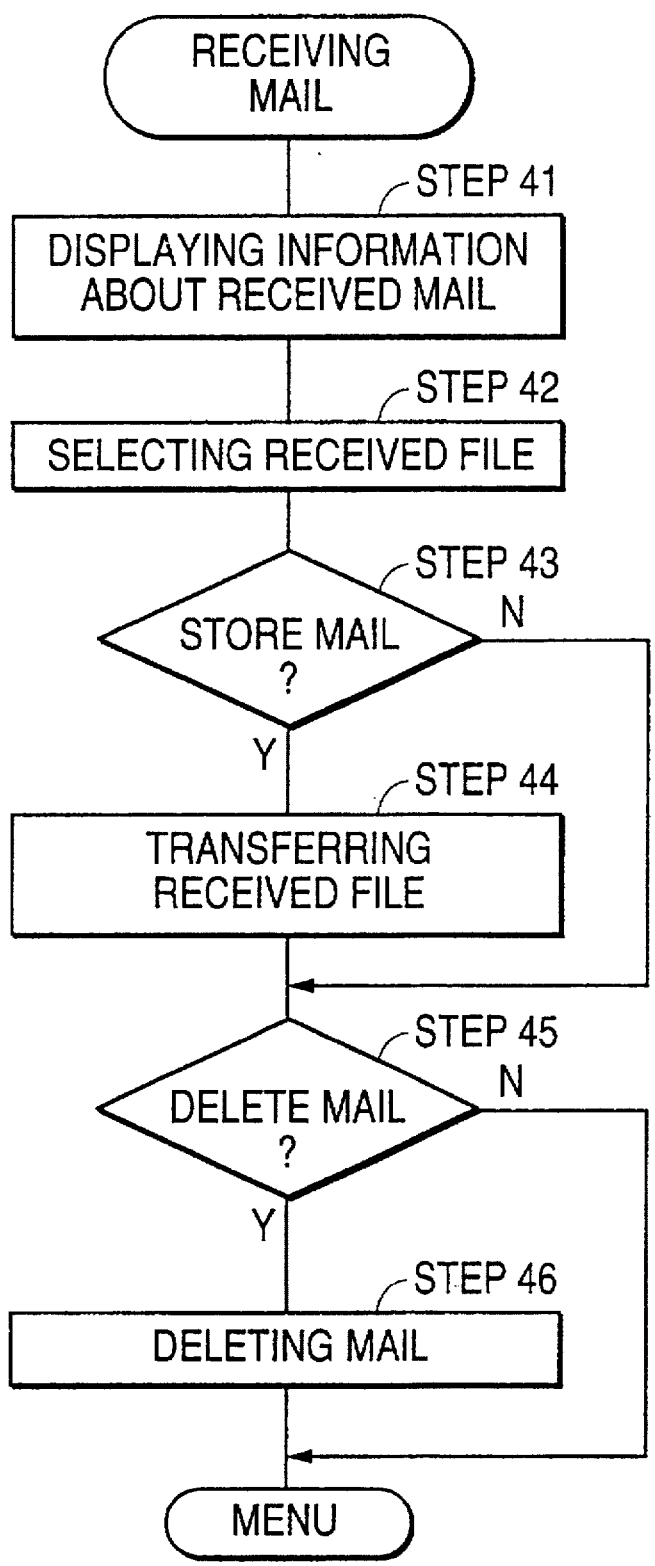
FIG. 7 is a flowchart showing the procedure for receiving an electronic mail.

Referring now to FIG. 7, the control sequence when the menu item, "RECEIVE E-MAIL" is selected is shown. Upon selection of "RECEIVE E-MAIL," the names of the senders of the received mail, the messages and the like are displayed on CRT 14 (step 41). The electronic mail transmitted through the telephone line 3 is received by NCU 19 and then demodulated by the modem 22 to be written into the storage section 18. Since the terminal adapter 2 has the power supply 23 composed independently of that of the personal computer 1, power can be applied to the terminal adapter 2 even when the personal computer 1 is not connected to the power supply. Accordingly, the electronic mail can automatically be received and written into the storage section 18 even when the personal computer 1 is not connected to the power supply.

Describing automatic reception of the electronic mail, the terminal adapter 2 can usually receive the electronic mail regardless of the status of the personal computer 1. When the call signal is delivered from the telephone office 4, the ring detector IC 27 detects the call signal, thereby delivering the RI signal to the communication control section 17. When confirming the RI signal, the communication control section 17 delivers the DTR signal to close the off-hook relay 25. Thus, the preparation for reception of the electronic mail is completed. When transmitted by the sender, the electronic mail is demodulated by the modem 22 through the line transformer 26 and then automatically stored in the storage section 18.

When much electronic mail is received at one time, each of the contents of the mail is written into the storage section 18. A list of the messages and the like constituting the contents of the mail is displayed on CRT 14. The cursor is moved to a desired message with the cursor keys and the return key is depressed, so that the desired electronic mail is selected (step 42). Thereafter, the instruction, "Store mail? Y/N" is displayed (step 43). When "Y" key is depressed, the received file of the selected electronic mail is read out of the storage section 18 to be transferred to the personal computer 1 (step 44). CPU 6 of the personal computer 1 reads the transferred electronic mail through the serial interface 9 such that the mail is stored in a received file storage section 12d.

When the received file has been transferred to the personal computer 1 at step 44 and when the "N" key is depressed at step 43, the selected electronic mail can be deleted from the storage section 18 by depression of a predetermined key (steps 45 and 46). When the recipient desires the selected mail to be stored in the storage section 18, the control sequence is completed. The storage capacity of the storage section 18 is reduced as a quantity of the electronic mail stored therein is increased. A new electronic mail cannot be received when the storage section 18 is full. Accordingly, it is desirable to delete the received electronic mail every time the recipient has read it.

A commercially available word processor software is installed in the personal computer 1 so that the recipient reads the received file stored in the received file storage section 12d.

According to the above-described data communication system, the personal computer 1 is connected through the terminal adapter 2 to the telephone line 3 so that the electronic mail can directly be exchanged between the personal computers 1. Consequently, the data communication system can easily be established. The transmitted electronic mail can be received by NCU 19 and written into the storage section 18 of the terminal adapter 2 when power is not applied to the personal computer 1 at the recipient side but is applied to the terminal adapter 2. The received mail can be read at the personal computer side when necessary. Consequently, the sender need not confirm as to whether or not the personal computer 1 at the recipient side is ready for receiving the electronic mail every time the mail is transmitted. This results in great advantage in the data communication. Furthermore, the name of the addressee, the name of the file to be transmitted and the like are selected on CRT 14 of the personal computer 1 with the key board 13 when the electronic mail is transmitted or received. Thus, the operation for the transmission and reception of the electronic mail is very easy.

The electronic mail transmitted from each terminal unit is stored in the storage section of the host computer in the prior art data communication system of the type that the terminal units are connected to the host computer. The capacity of the storage section of the host computer needs to be increased as the number of the terminal units connected to the host computer is increased. The number of the terminal units connected to the host computer thus has a definite limit. In the data communication system of the above-described embodiment, however, each terminal adapter 2 is provided with the storage section 18 for storing the electronic mail. When added to the data communication system, a new terminal unit 5 is provided with its own storage section. Consequently, the number of the terminal devices 5 connected to the system has no limitation and the system can be enlarged limitlessly.

The terminal units are radially connected to the central host computer in the prior art data communication system. The communication between the terminal units needs to be executed through the host computer. The whole system is stopped when the host computer is stopped, so that the electronic mail cannot be exchanged between the terminal devices. In the system of the above-described embodiment, however, each terminal unit 5 is provided with a terminal adapter 2 so that the terminal units 5 are directly connected to one another in the form of a network without a host computer. Consequently, the communication can directly be executed between the terminal units 5 and the whole system can be prevented from being stopped.

Although the terminal adapter 2 has a function of executing data communication between personal computers in the foregoing embodiment, it may have functions of telephone communication and facsimile communication. In this regard, the terminal adapter 2 is automatically switched among these functions in accordance with the type of a received signal.

Although the input device is a key board 13 and the display unit is CRT 14 in the foregoing embodiment, the input device may be a mouse and the display unit may be a liquid crystal display.

Although the telephone line 3 is employed as the communication line in the foregoing embodiment, the data communication may be executed by radio transmission.

Although the terminal adapter 2 is connected to the personal computer 1 in the foregoing embodiment, it may be connected to a work station (WS) or an office computer.

Although the commercially available word processor software is employed for making a file to be transmitted and reading a received file in the foregoing embodiment, a read-write editor may be installed in the personal computer 1 for the files to be transmitted and received.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

I claim:

1. A data communication system for transmitting data through a communication line between computers, the communication line being a public or commercial telecommunications line, the system comprising a plurality of terminal adapters connected between said communication line and said computers, respectively, each terminal adapter for transmitting and receiving the data to and from a respective computer, and each terminal adapter comprising:

a) a modem;
   b) an input-output section connected to said modem for inputting and outputting the data from and to the communication line via said modem;
   c) a serial transmission cable connected to the respective computer;
   d) a storage section from which the data is readable at the computer side via said serial transmission cable and into which the data is writable at the computer side via said serial transmission cable;
   e) a communication control section inputting the data from the storage section and outputting the input data to the input-output section according to an instruction from the computer, the communication control section writing the data input to the input-output section into the storage section independently of the operation of the computer; and
   f) a power supply, said power supply being independent and separate from a power supply of the respective computer; and each computer comprising:
   a) an addressee information storage section storing information about one or more addressees, the information including the names of the addressees;
   b) a transmittal file storage section for storing one or more files to be transmitted to the communication line via a respective terminal adapter;
   c) a received file storage section for storing a file received from the communication line via the respective adapter;
   d) a display unit;
   e) transmittal information displaying means for displaying, on said display unit, a list of the names of the addressees stored in the addressee information storage section and the names of the files stored in the transmittal file storage section;
   f) an input device;
   g) transmittal information selecting means for selecting one of the names of the addressees and one of the names of the files displayed on the display unit by the transmittal information displaying means, by way of said input device;
   h) transmission control means outputting the addressee information selected by the transmittal information selecting means to said communication control section of the respective terminal adapter;
   i) transmitted file writing means for writing, into said storage section of the respective terminal adapter, the transmitted file on the basis of the file name selected by the transmittal information selecting means;
   j) received file displaying means for displaying, on said display unit, a list of the names of the received files written into said storage section of the respective terminal adapter;
   k) received file selecting means for selecting a desired one of the file names displayed in the form of the list on said display unit by the received file displaying means; and
   l) received file writing means for writing, into said received file storage section, the received file on the basis of the file name selected by the received file selecting means.

2. A terminal unit provided in a data communication system for transmitting data through a communication line between computers, the communication line being a public or commercial telecommunication line, the terminal unit comprising a terminal adapter and a respective one of said computers, said terminal adapter comprising:

a) a modem;
   b) an input-output section connected to said modem for inputting and outputting the data from and to the communication line via said modem;
   c) a serial transmission cable connected to the respective computer;
   d) a storage section from which the data is readable at the computer side via said serial transmission cable and into which the data is writable at the computer side via said serial transmission cable;
   e) a communication control section inputting the data from the storage section and outputting the input data to the input-output section according to an instruction from the computer, the communication control section writing the data input to the input-output section into the storage section independently of the operation of the computer; and f) a power supply, said power supply being independent and separate from a power supply of the respective computer; and each computer comprising:
- a) an addressee information storage section storing information about one or more addressees, the information including the names of the addressees;
- b) a transmittal file storage section for storing one or more files to be transmitted to the communication line via a respective terminal adapter;
- c) a received file storage section for storing a file received from the communication line via the respective adapter;
- d) a display unit;
- e) transmittal information displaying means for displaying, on said display unit, a list of the names of the addressees stored in the addressee information storage section and the names of the files stored in the transmittal file storage section;
- f) an input device;
- g) transmittal information selecting means for selecting one of the names of the addressees and one of the names of the files displayed on the display unit by the transmittal information displaying means, by way of said input device;
- h) transmission control means outputting the addressee information selected by the transmittal information selecting means to said communication control section of the respective terminal adapter;
- i) transmitted file writing means for writing, into said storage section of the respective terminal adapter, the transmitted file on the basis of the file name selected by the transmittal information selecting means;
- j) received file displaying means for displaying, on said display unit, a list of the names of the received files written into said storage section of the respective terminal adapter;
- k) received file selecting means for selecting a desired one of the file names displayed in the form of the list on said display unit by the received file displaying means; and
- l) received file writing means for writing, into said received file storage section, the received file on the basis of the file name selected by the received file selecting means.

3. A data communication system according to claim 1, wherein said storage section of said terminal adapter comprises a static random access memory.

4. A data communication system according to claim 2, wherein said storage section of said terminal adapter comprises a static random access memory.

* * * * *